(12) United States Patent
Chung

(10) Patent No.: US 7,109,595 B2
(45) Date of Patent: Sep. 19, 2006

(54) SMALL MULTI-FUNCTIONAL BUTANE GAS-POWERED PORTABLE ELECTRIC GENERATOR

(76) Inventor: Yu-Lin Chung, No. 4, Lane 130, Nan-Kang Rd, Sec. 3, Taipei (TW)

( * ) Notice: Subject to any disclaimer, the term of this patent is extended or adjusted under 35 U.S.C. 154(b) by 61 days.

(21) Appl. No.: 10/887,499

(22) Filed: Jul. 7, 2004

(65) Prior Publication Data
US 2006/0006654 A1 Jan. 12, 2006

(51) Int. Cl.
H02P 9/04 (2006.01)
H02K 5/00 (2006.01)
F02B 63/04 (2006.01)

(52) U.S. Cl. .................. 290/40 B; 290/1 R; 290/40 C
(58) Field of Classification Search ................ 290/1 R, 290/40 B, 40 C
See application file for complete search history.

(56) References Cited

U.S. PATENT DOCUMENTS

| | | | | |
|---|---|---|---|---|
| 2,482,794 A | * | 9/1949 | Peterson | 431/130 |
| 3,045,894 A | * | 7/1962 | Ross | 415/131 |
| 3,696,612 A | * | 10/1972 | Berman | 60/786 |
| 3,782,108 A | * | 1/1974 | Holste | 60/793 |
| 4,005,572 A | * | 2/1977 | Giffhorn | 60/39.281 |
| 4,566,308 A | * | 1/1986 | Powell | 73/1.57 |
| 4,729,218 A | * | 3/1988 | Haselbauer et al. | 60/802 |
| 4,831,277 A | * | 5/1989 | Christopher | 290/1 A |
| 5,161,694 A | * | 11/1992 | Yoon et al. | 209/5 |
| 5,263,816 A | * | 11/1993 | Weimer et al. | 415/131 |
| 5,550,410 A | * | 8/1996 | Titus | 290/52 |
| 5,558,065 A | * | 9/1996 | Arakawa | 123/490 |
| 5,625,276 A | * | 4/1997 | Scott et al. | 322/24 |
| 5,886,504 A | * | 3/1999 | Scott et al. | 322/15 |
| 5,928,605 A | * | 7/1999 | Bonnema et al. | 422/5 |
| 5,932,940 A | * | 8/1999 | Epstein et al. | 310/40 MM |
| 6,018,200 A | * | 1/2000 | Anderson et al. | 290/40 B |
| 6,118,186 A | * | 9/2000 | Scott et al. | 290/40 B |
| 6,234,784 B1 | * | 5/2001 | Yoshinaga et al. | 431/153 |
| 6,275,398 B1 | * | 8/2001 | Sumimoto et al. | 363/89 |
| 6,298,653 B1 | * | 10/2001 | Lawlor | 60/772 |
| 6,334,299 B1 | * | 1/2002 | Lawlor | 60/39.35 |
| 6,392,313 B1 | * | 5/2002 | Epstein et al. | 290/52 |
| 6,420,855 B1 | * | 7/2002 | Taniguchi et al. | 322/28 |
| 6,434,924 B1 | * | 8/2002 | Lawlor | 60/772 |
| 6,446,425 B1 | * | 9/2002 | Lawlor | 60/768 |
| 6,446,426 B1 | * | 9/2002 | Sweeney et al. | 60/39.81 |
| 6,608,393 B1 | * | 8/2003 | Anderson | 290/1 A |
| 6,789,000 B1 | * | 9/2004 | Munson, Jr. | 700/287 |
| 6,888,263 B1 | * | 5/2005 | Satoh et al. | 290/52 |
| 6,941,217 B1 | * | 9/2005 | Munson, Jr. | 701/100 |
| 6,952,056 B1 | * | 10/2005 | Brandenburg et al. | 290/1 A |
| 6,979,914 B1 | * | 12/2005 | McKelvey et al. | 290/40 C |

* cited by examiner

*Primary Examiner*—Darren Schuberg
*Assistant Examiner*—Pedro J. Cuevas
(74) *Attorney, Agent, or Firm*—Pro-Techtor Int'l Services

(57) ABSTRACT

The object of the present invention is a multi-functional electric generator comprising, an engine, a generator, a voltage-stabilizer control circuit, a gas storage gauge and a lighter. A manual electrical rod can be assembled to a side of the engine allowing the generator to be manually activated, or through the motor assembled inside the generator. The gas storage gauge assembled on a side of the engine can be connected with a conventional lighter through the lighter opening, allowing reception of the Butane gas from the lighter. Positive and negative poles are formed on a power output end connected to the voltage-stabilizer.

2 Claims, 1 Drawing Sheet

SMALL MULTI-FUNCTIONAL BUTANE GAS-POWERED PORTABLE ELECTRIC GENERATOR

BACKGROUND OF THE INVENTION (a) Field of the Invention

The present invention relates to a small multi-functional electric generator, especially used during traveling. Butane fluid used in conventional lighters is applied in the generator for fueling, thereby activating the small multi-functional electric generator temporary for emergency usage.

(b) Description of the Prior Art

The conventional electric generator is larger in size and inconvenient to carry, moreover, the fuel used is difficult to store and acquire, therefore not viable to carry when traveling. It is bothersome for a traveler if general electronic equipment is carried such as emergency lights, torches, photography equipment, laptops or cellular phones to be carried, runs out of power without access to recharge equipment.

SUMMARY OF THE INVENTION

The main object of the present invention is a small multi-functional electric generator that uses Butane gas applied in a conventional lighter to generate electricity, providing general electronic equipment with a small multi-functional generator. Providing backup power for general power using equipment, such as emergency lights, torches, photography equipment, laptops and cellular phones etc.

To enable a further understanding of the said objectives and the technological methods of the invention herein, the brief description of the drawings below is followed by the detailed description of the preferred embodiments.

DETAILED DESCRIPTION OF THE PREFFERRED EMBODIMENT

Figure 1:
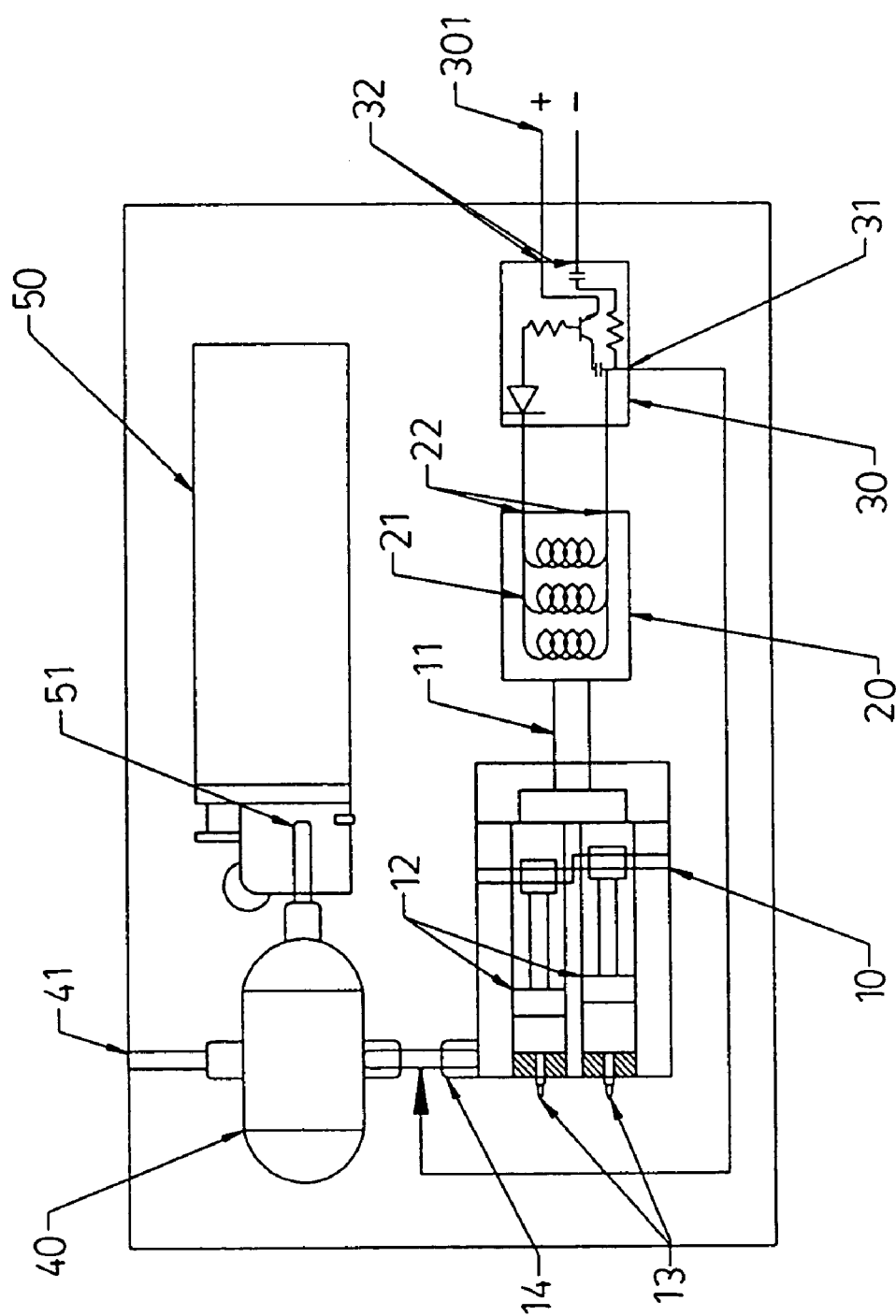
FIG. 1 is a flow chart block diagram according to the present invention.

To better understand the present invention, detailed descriptions shall be given with the accompany drawings hereunder.

FIG. 1 refers to a small multi-functional generator consisting of an engine 10, an electric generator 20, a voltage-stabilizer control circuit 30, a gas storage gauge 40 and a lighter 50.

The generator is connected by a rotating axis 11 to an output shaft extension of the engine 10, the inside of the engine 10 consists of a number of valves 11, a number of igniters 12 and an engine fuel opening 14. The inside of the generator 20 consists of magnetic field windings 21 and an output end 22 is connected to the voltage-stabilizer control circuit 30. A information feedback circuit output end 31 of the voltage-stabilizer control circuit 30 is connected in between the gas storage gauge 40 and engine fuel opening 14, in addition a power output end 32 of the voltage-stabilizer control circuit 30 is connected to terminals having a positive and negative pole, thus providing connectors for backup power supply.

The outlet of the gas storage gauge 40 is connected to the engine fuel opening 14 and an air opening 41 is assembled on another side of the gas storage gauge 40, in addition, the inlet opening is connected to a lighter opening 51 of the lighter 50, thus providing the engine 10 with Butane fluid stored by the lighter 50.

A manual electric rod is connected to the front end of the engine 10, for manually activating the engine. An activation motor can be assembled inside of the generator 20, and by applying the movement of the motor, the engine 10 can be activated, in addition, the voltage-stabilizer control circuit 30 may have storage capabilities, storing the electricity produced by the engine 10.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A small multi-functional electric generator comprising:
    an engine having valves, igniters, an engine fuel opening, and a rotating engine axis with an output shaft extension;
    a generator having a rotating axis with an input end connected to said output shaft extension of said rotating engine axis, and magnetic field windings with output electrical connections for electrical power output;
    a voltage-stabilizer control circuit having an input end connected to said output electrical connections of said generator and an output end having positive and negative terminal electrical connections;
    an information feedback circuit with a feedback input electrically connected to said voltage-stabilizer control circuit, and a feedback output connected to said engine fuel opening;
    a gas storage gauge having an outlet fuel opening connected to said engine fuel opening, an inlet fuel opening, and an air opening;
    a lighter having a fuel connection to said inlet fuel opening on said gas storage gauge.

2. A small multi-functional electric generator as recited in claim 1, whereby a manual electrical rod is connected to a fuel inlet end of said engine.

* * * * *